United States Patent [19]

Takahashi

[11] Patent Number: 5,091,618
[45] Date of Patent: Feb. 25, 1992

[54] IC CARD READER/WRITER

[75] Inventor: Takehiro Takahashi, Toride, Japan

[73] Assignee: Hitachi Maxell, Ltd., Osaka, Japan

[21] Appl. No.: 526,887

[22] Filed: May 22, 1990

[30] Foreign Application Priority Data

May 23, 1989 [JP] Japan .................................. 1-129292

[51] Int. Cl.⁵ .......................................... G06K 17/06
[52] U.S. Cl. .................................. 235/441; 235/492; 439/261; 439/635
[58] Field of Search ............... 235/441, 492; 439/260, 439/261, 635

[56] References Cited

U.S. PATENT DOCUMENTS

| | | | |
|---|---|---|---|
| 2,936,439 | 5/1960 | Murphy | 439/635 |
| 4,404,464 | 9/1983 | Moreno | 235/441 X |
| 4,443,049 | 4/1984 | De Pommery et al. | |
| 4,449,775 | 5/1984 | de Pommery et al. | |

FOREIGN PATENT DOCUMENTS

| | | |
|---|---|---|
| 0139593 | 5/1985 | European Pat. Off. . |
| 0198739 | 10/1986 | European Pat. Off. . |
| 0218504 | 4/1987 | European Pat. Off. . |
| 2607287 | 5/1988 | France . |
| 60-15885 | 1/1985 | Japan . |
| 61-16386 | 1/1986 | Japan . |
| WO7900543 | 8/1979 | PCT Int'l Appl. . |

*Primary Examiner*—David Trafton
*Attorney, Agent, or Firm*—Birch, Stewart, Kolasch & Birch

[57] ABSTRACT

The present invention relates to an IC card reader/writer into which an IC card can be easily inserted and having connection reliability of contact points thereof.

According to the present invention, there is provided an IC card reader/writer including an IC card insertion hole, a part for detecting a thickness of the IC card, and a contact mechanism for contacting contact points with terminals of an inserted IC card, the contact mechanism identifying insertion of the IC card by an output of this detecting part so as to connect the contact points with the IC card. In this way, it is possible to realize a small-sized and thin IC card reader/writer having high reliability at a low cost.

12 Claims, 4 Drawing Sheets

FIG. I

IC CARD READER/WRITER

BACKGROUND OF THE INVENTION

1. Industrial Field of the Invention

The present invention relates to an IC card reader/writer and, more particularly, to an IC card reader/writer into which an IC card can be easily inserted and having high reliability in an electrical connection of contact points with the IC card.

2. Description of the Prior Art

IC card reader/writers are used for writing data in IC cards or reading the same from the IC cards. Conventionally, as disclosed in Japanese Patent Unexamined Publication No. 61-16386 (A) for example, it is usually such IC card reader/writer that associated contact points of the IC card reader/writer are vertically displaced by making use of a force in the inserting direction of the IC card, to thereby bring the contact points into contact with terminals of the IC card.

Further, as disclosed in Japanese Patent Unexamined Publication No. 60-15885, in a portable IC card reader/writer, for the purpose of simplifying its mechanism, employed was a construction in which an IC card is loaded on a lid mounted rotatably around a point at its one end and the contact points of the IC card reader/writer are brought into contact with terminals of the IC card by closing the lid.

However, the IC card reader/writer in which the contact points thereof are vertically displaced by making use of the force in the inserting direction of the IC card to thereby bring the contact points of the IC card reader/writer into contact with the terminals of the IC card, has such defects that its mechanism is large-scaled and a cost for manufacturing the device is increased, that the displacing mechanism of the contact points is complicated and this complicated mechanism often causes trouble, and that a contact failure sometimes occurs because the contact points of the IC card reader/writer will not slide across contact points of the IC card so that there is no clearing effect at the contact points between them.

In the IC card reader/writer having such construction that the IC card is loaded on the lid rotatably mounted around the point at its one end and that the contact points of the IC card reader/writer are brought into contact with the terminals of the IC card by closing the lid, there appear further disadvantages such that it is inconvenient to handle the IC card reader/writer because the two-step operations of inserting or loading the IC card and closing the lid are necessary and that a manner of operating the IC card reader/writer is different from that of a magnetic card conventionally and widely used for an automatic deposit machine and so on.

SUMMARY OF THE INVENTION

One object of the present invention is to solve the problems of the above-described conventional IC card reader/writer where the contact points are vertically displaced with respect to the IC card terminals by making use of the force in the inserting direction of the IC card, to thereby bring the contact points of the IC card reader/writer into contact with the terminals of the IC card, such problems being caused by the mechanism which is large-sized and expensive to manufacture, as well as the displacing mechanism of the contact points being complicated, which often causes trouble, with a contact failure easily occurring because the contact points of the IC card reader/writer do not slide across contact points of the IC card so that there is no cleaning effect at the contact points of the IC card reader/writer. The invention also solves the disadvantages of the conventional IC card reader/writer having the construction that the IC card is mounted or loaded on the lid thereof rotating around the point at its one end and that the contact points of the IC card reader/writer are brought into contact with the terminals of the IC card upon closing the lid, which results in inconvenience in handling the IC card reader/writer because two-step operations of insertion operation of the IC card and of closure operation of the lid are necessary. Further, manner of operating the IC card reader/writer which differs from that of a magnetic card conventionally widely used for an automatic deposit machine or the like. Thus, the other object of the present invention is to provide a small sized IC card reader/writer into which an IC card can be easily inserted or loaded.

In order to achieve such objects, according to the present invention, in an IC card reader/writer including an IC card insertion hole and a contact mechanism for bringing contact points of the IC card reader/writer into contact with terminals of the inserted IC card, it comprises means for detection of a thickness of the IC card, a contact mechanism for recognizing or identifying insertion of the IC card by an output from the detecting means so as to connect the contact points with the IC card. More specifically, for example, the contact mechanism is retained by an axis extending parallel to a main surface of the IC card, and one end of the contact mechanism is forced up by the inserted IC card so that contact points at the other end of the contact mechanism are brought into contact with the terminals of the IC card. The contact mechanism is provided with a plurality of contact points. In accordance with insertion of the IC card, a first set of contact points initially contact with a first set of terminals of the IC card, and subsequently, a second set of contact points contact with a second set of terminals of the IC card. Further, it is preferred that the first set of contact points are connected to a power source line and an earth or ground line, and that the second set of contact points are connected to signal lines.

In this way, by providing the means for detecting a thickness of the IC card and the contact mechanism for recognizing insertion of the IC card by an output from the detecting means so as to bring the contact points into contact with the IC card, it is possible to realize a small-sized, thin and highly reliable IC card reader/writer which can be manufactured at a low cost.

The above-mentioned and other objects, features as well as advantages of the invention will become more clearer from the following description of the preferred embodiments.

According to one aspect of the invention an IC card reader/writer includes a main body having an IC card insertion aperture therein, a base extended from the main body for guiding an IC card thereon to be inserted through the insertion aperture and a contact mechanism to bring electrical contact points of said IC card reader/writer into contact with terminals on the IC card inserted through the insertion aperture, wherein said contact mechanism comprises a contact spring frame rotatably supported by a pivot, connection terminals provided on one end of said contact spring frame for contacting with terminals on the IC card, and a forced-up portion provided at another end of the contact spring frame for riding on the IC card when the IC card is inserted through the insertion aperture to force up said another end to an extent of a thickness of the IC card and rotate said contact spring frame, the IC card being held between the rotated connection terminals and the base so as to establish an electrical connection between the connection terminals of the contact mechanism and the terminals of the IC card.

The connection terminals of said contact mechanism comprise contact springs to be connected with the terminals of the IC card. The contact mechanism is disposed on an innermost portion of the base within the IC card reader/writer, the pivot for supporting the contact spring frame is supported by an arm attached to the base and the arm operates as a stopper by contacting with a leading end of the IC card when the IC card is inserted. The contact spring frame may be formed integrally with the forced-up portion for rotating the contact spring frame.

DETAILED DESCRIPTION OF THE PREFERRED EMBODIMENTS

Preferred embodiments of the present invention will be described in detail hereinafter with reference to the accompanying drawings.

Figure 1:
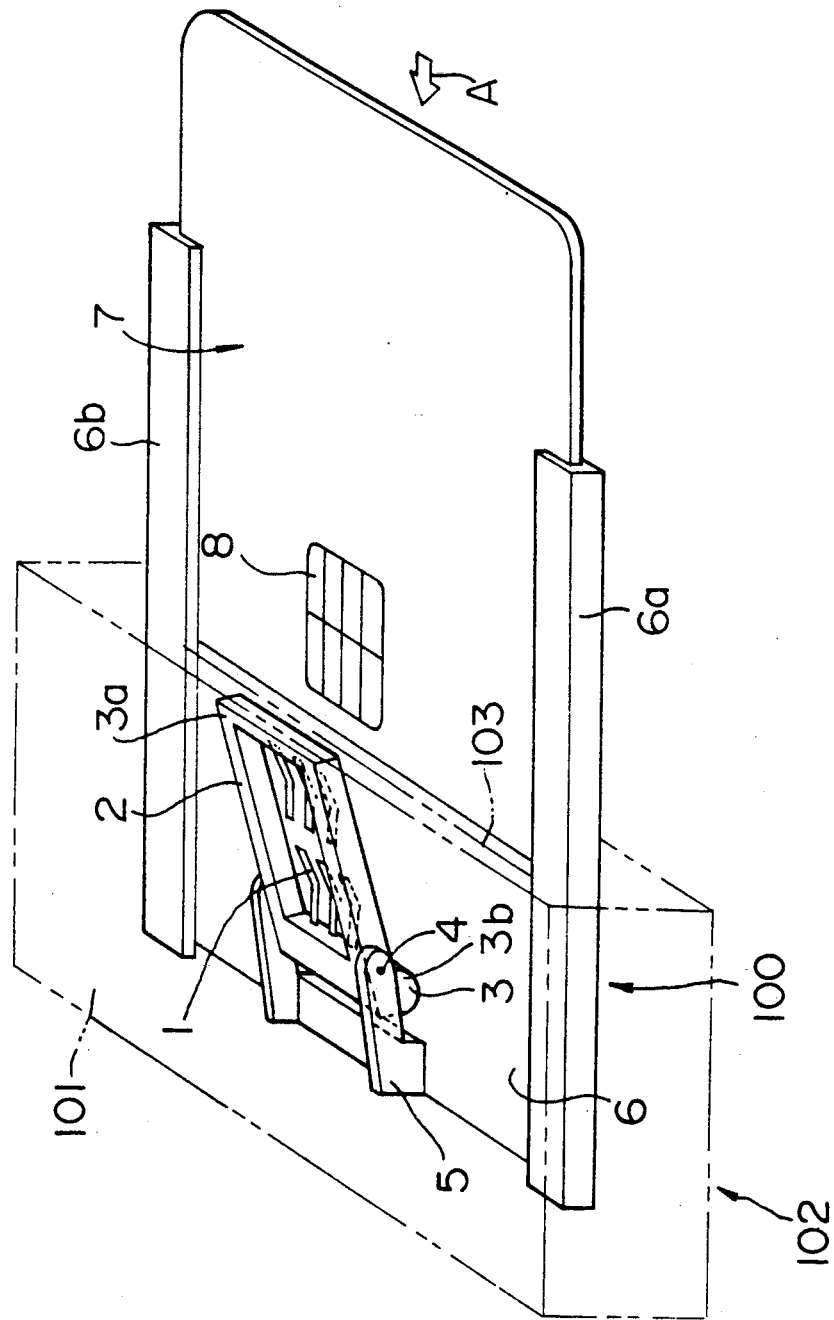
FIG. 1 is a perspective view of an IC card contact mechanism of a first embodiment of an IC card reader/writer according to the present invention.
Figure 2:
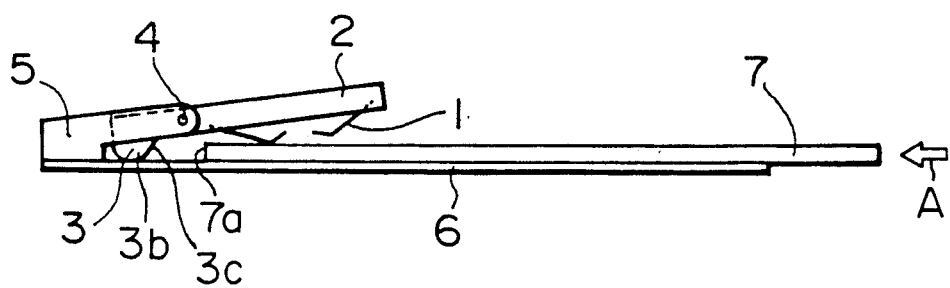
FIG. 2 is a side view of the IC card contact mechanism, illustrating a state during insertion of an IC card.
Figure 3:
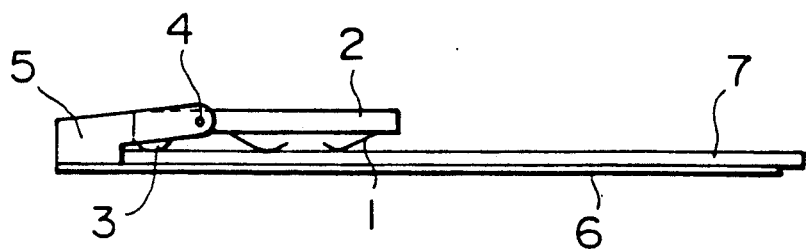
FIG. 3 is a side view of the same as FIG. 2, when the insertion of the IC card is completed.

FIG. 1 is a perspective view of an IC card contact mechanism of an IC card reader/writer according to a first embodiment of the present invention. FIG. 2 is a side view of the IC card contact mechanism during insertion of the IC card. FIG. 3 is a side view of the same as FIG. 2 when the insertion of the IC card is completed.

A contact mechanism 100 is provided in a main body 101, of IC card reader/writer 102, shown by imaginary lines in FIG. 1. Reference numeral 103 is an aperture for allowing to insert an IC card 7 therethrough into the main body 101. Contact springs 1 are secured at respective one ends thereof to a contact spring frame 2 which is rotatably connected to an arm 5 to rotate around a securing pin 4 as a pivot. The arm 5 is mounted on a stationary base 6 and also operates as a stopper by contacting with a leading end of an IC card 7 when the IC card 7 is inserted. Though the contact spring frame 2 is disposed on the innermost portion of the base 6 in this embodiment, it may be disposed on the outermost portion of the base 6. In this embodiment, contact springs 1 made of electrically conductive and resilient material serve as electrical connection terminals of the contact mechanism to be electrically connected with the terminals of the IC card 7. However, the electrical connecting terminals may be made of spring-biased contact pins to be electrically connected with the terminals of the IC card 7. The respective contact springs 1 are connected through a flexible printed wiring plate or web to a processing unit in the main body 101 but the wiring plate is not shown here.

The contact spring frame 2 is biased by means of a torsion spring (not shown) attached to the securing pin 4 in such a manner that, when the IC card 7 is not inserted, a remote end 3a of the contact spring frame 2 is always remote from the IC card 7 on the side thereof on which the contact springs 1 are provided; that is to say, one end 3 of the contact spring frame 2 is brought into contact with the bottom plate 6. According to the above structure, the contact springs 1 are apart from the IC card 7, during insertion of the IC card 7, as shown in FIG. 2. When the IC card 7 is successively inserted until the contact springs 1 are positioned above a terminal portion 8 of the IC card 7, the contact spring frame end 3 having a bulge or protrusion 3b is initially forced up by an edge 7a of the IC card 7. As the card 7 is inserted in the direction of an arrow A on the base plate 6 guided by parallel stationary guide members 6a, 6b the contact spring frame end 3 is brought into a state that it rides on a surface of the IC card 7, as shown in FIG. 3. Thus, the thickness of the IC card 7 is detected by the protrusion end 3b on the detecting means. An output of the detection corresponds to a rotational displacement of the protrusion 3b, which results in the rotational displacement of the spring frame 2 as the contact mechanism and then the IC card 7 is held between the rotated contact spring 1 and the base 6. Under this condition, the contact spring 1 are pressed against the IC card terminal portion 8 with a designed optimum load (50 gf in this embodiment).

Figure 4:
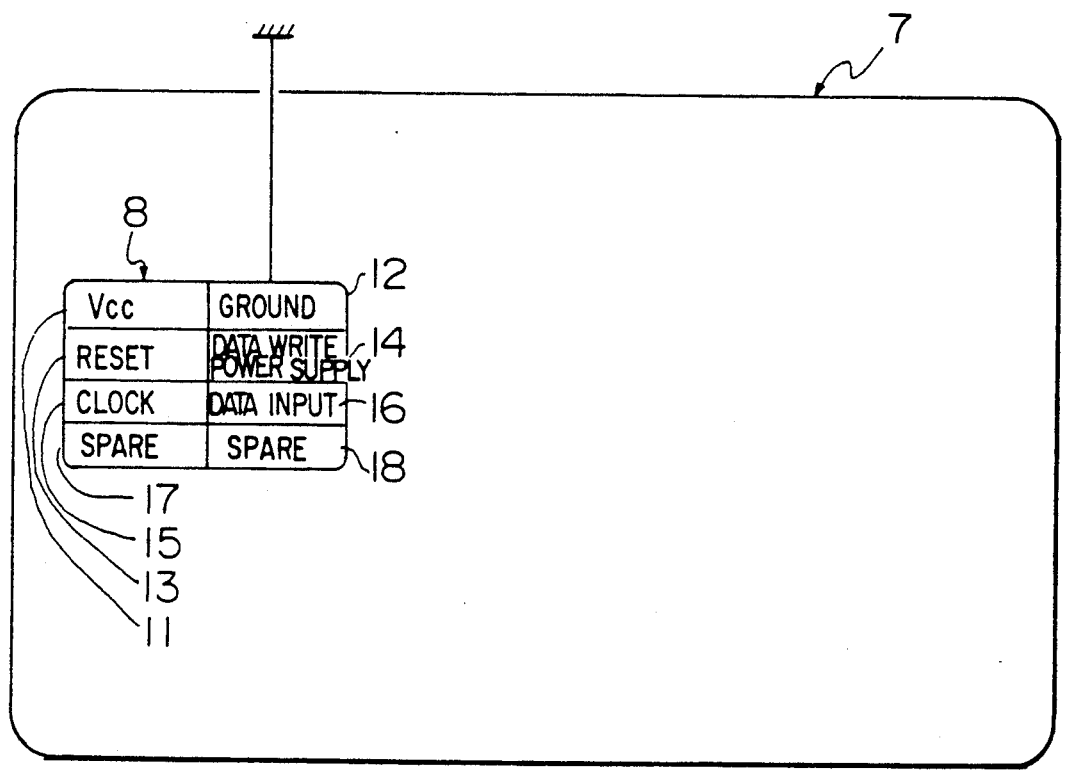
FIG. 4 is a sketch of the outer configuration of the IC card.

FIG. 4 is a sketch of the outer configuration of the IC card 7. The IC card terminal portion 8 comprises a power source terminal 11, a ground terminal 12, a reset terminal 13, a data write power source terminal 14, a clock terminal 15, a data input/output terminal 16, and spare terminals 17 and 18. If the IC card 7 is taken out while being accessed, the IC card 7 is sometimes damaged because the IC therein is latched up.

The IC card reader/writer according to an embodiment of the present invention is constituted in such a manner that, among the contact springs 1, the springs which are to be contacted with the power source terminal 11 and ground terminal 12 of the IC card terminal portion 8 are projected to extend more than the other springs which are to be contacted with the remaining terminals provided on the IC card 7, so that the former springs to be contacted with the power source and ground terminals 11, 12 can be brought into contact with the power source terminal 11 and the ground terminal 12 of the IC card terminal portion 8 earlier than the other contacts by the remaining springs upon insertion of the IC card 7 into the IC card reader/writer. Additionally, the former springs are kept in contact with the IC card terminal portion 8 until a point of time later than that when the latter contact springs are disconnected from the associated contacts on the card 7 upon the IC card being taken out of the IC card reader/writer.

Figure 2A:
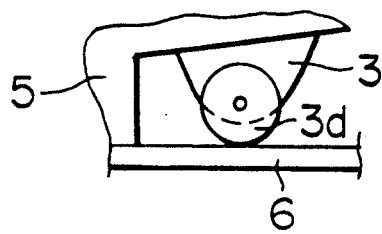
FIG. 2A shows a part of a modification of the IC card contact mechanism of FIG. 2.
Figure 5:
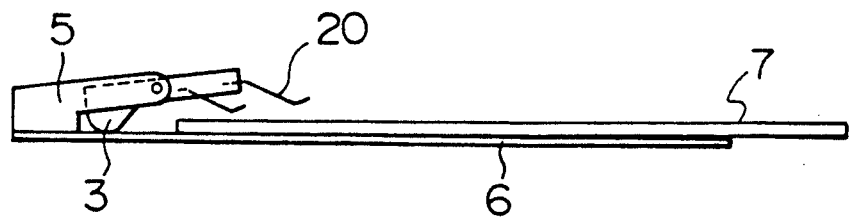
FIG. 5 is a side view which illustrates an IC card contact mechanism having a modified contact structure during insertion of the IC card according to the first embodiment of the invention.

Further, in the first embodiment, the protrusion portion 3b of the contact spring frame end 3 is formed to have an inclined and rounded outer face 3c so as to be forced up smoothly when the end 7a of the IC card 7 is pressed in the direction A against this frame end 3. The frame end 3 may be provided with an idler roller or rollers as shown in FIG. 2A to thereby reduce friction between the IC card 7 and the contact spring frame end 3. Also, though the number of the contact springs 1 is six in the illustrated embodiment, it may be eight. In this case, the contact springs can be also in contact with the spare terminals of the IC card 7. In the case where the IC card 7 is operated by a single power supply and the data write power supply is unnecessary, the corresponding contact spring may be omitted. Alternatively, all the contact springs 20 may be provided in the same direction, as shown in FIG. 5.

Figure 6:
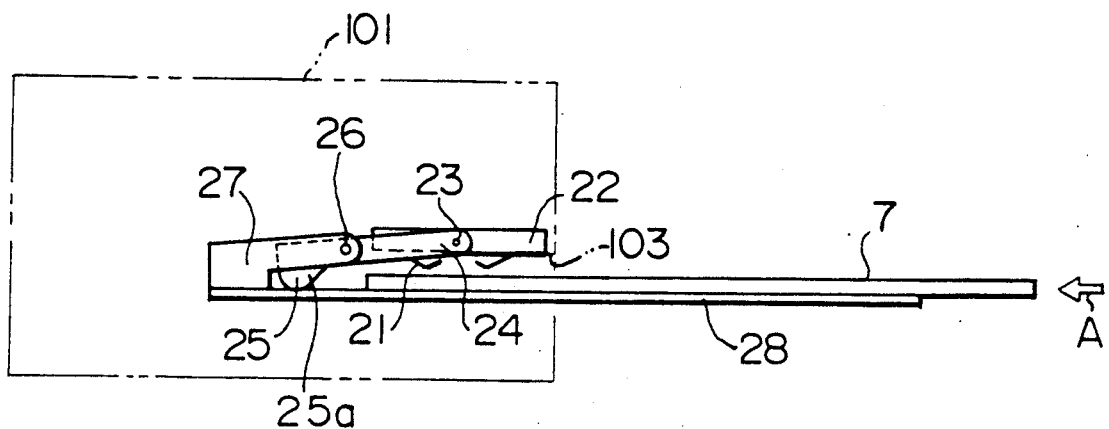
FIG. 6 is a side view of an IC card contact mechanism illustrating a state during insertion of the IC card according to a second embodiment of the invention.
Figure 7:
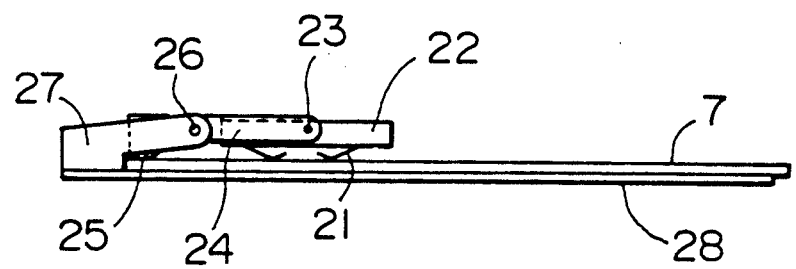
FIG. 7 is a side view of the same as FIG. 6, when the insertion of the IC card is completed.

FIG. 6 is a side view of an IC card contact mechanism according to a second embodiment of the present invention during insertion of the IC card. FIG. 7 is a side view of the same as FIG. 6 when the insertion of the IC card is completed. Contact springs 21 are secured by the first contact spring frame 22. The first contact spring frame 22 is rotatably attached to a movable arm 24 as the second contact spring frame around a securing pin 23 for the contact spring frame 22.

The movable arm 24 is rotatably attached to a fixed arm 27 around a movable arm securing pin 26. The fixed arm 27 is secured to a bottom plate 28. When the IC card 7 is inserted in the direction A on and along the bottom plate 28, a movable arm end 25 with a protrusion 25a similar to the protrusion 3b is forced up so that the contact springs 21 are brought into contact with the IC card terminal portion 8, this being similar to the first embodiment. In this second embodiment, however, since the contact spring frame comprises the two movable portions 22, 24, the height from the bottom plate 28 to the highest contact spring frame 22 can be reduced, thereby decreasing a thickness of the contact mechanism of the IC card reader/writer.

In addition, because loads applied to each of the contact springs 21 are equalized owing to rotation of the contact spring frame 22, reliability in contact can be improved.

As mentioned above, since the IC card reader/writer includes the means for detecting a thickness of the IC card and the contact mechanism which recognizes insertion of the IC card by an output from the detecting means and brings the contact springs into contact with the IC card, it is possible to realize a small-sized IC card reader/writer having high reliability at a low cost.

the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An IC card reader/writer comprising a main body having an IC card insertion aperture therein, a base extending from said main body for guiding an IC card thereon to be inserted through said insertion aperture and a contact mechanism to bring electrical contact points of said IC card reader/writer into contact with terminals on the IC card inserted through the insertion aperture, said contact mechanism including:

a pair of arms secured on said base near the ultimate position of the IC card when insertion thereof has been completed, the free ends of said pair of arms extending toward said insertion aperture;

a first frame pivotally supported by said pair of arms at the free ends thereof, said first frame carrying a plurality of sets of the electrical contact points in a form of contact spring, each of the sets thereof arranged being spaced apart along the insertion direction of the IC card; and, a protrusion portion provided at one end of said first frame remote from said insertion aperture extending toward said base, said first frame being biased so that said protrusion portion contacts said base when no IC card is interposed therebetween, said protrusion portion being forced upward by an amount equal to the thickness of the IC card when the leading edge of the IC card pushes said protrusion portion to ride thereon in the course of insertion thereof toward the ultimate position thereof, thereby the other end of said first frame near said insertion aperture being forced downward and the plurality of the electrical contact points in a form of contact spring carried by said first frame being brought into contact with terminals of the IC card and completing the connection therewith when the leading edge of the IC card has been reached to the ultimate position thereof.

2. The IC card reader/writer according to claim 1, wherein said plurality of sets of electrical contact points comprises a first set of electrical contact points and a second set of electrical contact points, and said first set of electrical contact points are initially contacted with a first set of the terminals on the IC card in accordance with the insertion of the IC card and subsequently, said second set of electrical contact points are contacted with a second set of the terminals on the IC card.

3. The IC card reader/writer according to claim 2, wherein said first set of electrical contact points are connected to power supply and ground lines, and said second set of electrical contact points are connected to signal lines.

4. The IC card reader/writer according to claim 1, wherein said pair of arms serve as a stopper for the IC card defining the ultimate position of the IC card when the insertion thereof has been completed.

5. The IC card reader/writer according to claim 1, wherein said protrusion portion is formed integrally with said first frame.

6. The IC card reader/writer according to claim 1, wherein said protrusion portion is provided with a roller.

7. An IC card reader/writer comprising a main body having an IC card insertion aperture therein, a base extending from said main body for guiding an IC card thereon to be inserted through said insertion aperture and a contact mechanism to bring electrical contact points of said IC card reader/writer into contact with terminals on the IC card inserted through said insertion aperture, said contact mechanism including:

a pair of arms secured on said base near the ultimate position of the IC card when insertion thereof has been completed, the free ends of said pair of arms extending toward the insertion aperture;

a first frame pivotally supported by said pair of arms at the free ends thereof;

a second frame pivotally supported by said first frame at the first end thereof near said insertion aperture, said second frame carrying a plurality of sets of the electrical contact points in a form of contact spring, each of the sets thereof arranged being spaced apart along the insertion direction of the IC card; and, a protrusion portion provided at the second end of said first frame remote from said insertion aperture extending toward said base, said first frame being biased so that said protrusion portion contacts said base when no IC card is interposed therebetween, said protrusion portion being forced upward by an amount equal to the thickness of the IC card when the leading edge of the IC card pushes said protrusion portion to ride thereon in the course of the insertion thereof toward the ultimate position thereof, thereby the first end of said first frame being forced downward and the plurality of sets of the electrical contact points in a form of contact spring carried by said second frame being brought into contact with terminals of the IC card and completing the connection therewith when the leading edge of the IC card has been reached to the ultimate position thereof.

8. The IC card reader/writer according to claim 7, wherein said plurality of sets of electrical contact points comprises a first set of electrical contact points and a second set of electrical contact points, and said first set of electrical contact points are initially contacted with a first set of the terminals on the IC card in accordance with the insertion of the IC card and, subsequently, said second set of electrical contact points are contacted with a second set of the terminals on the IC card.

9. The IC card reader/writer according to claim 8, wherein said first set of electrical contact points are connected to power supply and ground lines, and said second set of electrical contact points are connected to signal lines.

10. The IC card reader/writer according to claim 7, wherein said pair of arms serve as a stopper for the IC card defining the ultimate position of the IC card when the insertion thereof has been completed.

11. The IC card reader/writer according to claim 7, wherein said protrusion portion is formed integrally with said first frame.

12. The IC card reader writer according to claim 7, wherein said protrusion portion is provided with a roller.

* * * * *